United States Patent [19]
Hamada et al.

[11] Patent Number: 6,017,996
[45] Date of Patent: Jan. 25, 2000

[54] METHOD FOR THE CONTINUOUS MANUFACTURING OF SILICONE RUBBER COMPOSITION

[75] Inventors: Mitsuo Hamada, Chiba Prefecture; Tomoo Kinoshita; Kaoru Kunimatsu, both of Fukui Prefecture, all of Japan

[73] Assignee: Dow Corning Torray Silicone Co., Ltd., Tokyo, Japan

[21] Appl. No.: 09/151,120

[22] Filed: Sep. 10, 1998

[30] Foreign Application Priority Data

Sep. 11, 1997 [JP] Japan .................................. 9-264970

[51] Int. Cl.⁷ ...................................................... C08G 5/54
[52] U.S. Cl. ......................... 524/588; 524/860; 524/866; 366/82; 366/85; 264/211.23; 264/349
[58] Field of Search ..................................... 524/588, 866, 524/860; 264/211.23, 349; 366/82, 85

[56] References Cited

U.S. PATENT DOCUMENTS

| | | | |
|---|---|---|---|
| 5,198,171 | 3/1993 | Kasahara et al. | 264/211 |
| 5,320,796 | 6/1994 | Harashima et al. | 264/349 |
| 5,409,978 | 4/1995 | Hamada et al. | 524/265 |

*Primary Examiner*—Margaret G. Moore
*Attorney, Agent, or Firm*—Jennifer S. Warren; William F. Boley

[57] ABSTRACT

A method for manufacturing of a silicone rubber base composition in a mass-like form, comprises:

(A) preparing a freely flowable powdered silicone rubber composition comprising
  (a) a cross-linkable polydiorganosiloxane with a viscosity of at least $1\times10^5$ mPa.s at 25° C. and
  (b) an inorganic filler, and
(B) continuously kneading and massing the powdered silicone rubber composition in a multiple-stage siding shear-type single-screw extruder.

This method provides for continuous preparation of a silicone rubber base compound without the use of a dual-screw mixer-extruder having a large length to diameter ratio, without abrasive wear of screws and cylinders with such inorganic fillers as diatomaceous earth power, quartz or a similar large-grain and hard powders, without blackening of the mixed silicone rubber composition, and without production problems associated with the use of large quantities of fumed silica, sedimentary silica, or a similar reinforcing silica.

8 Claims, 2 Drawing Sheets

METHOD FOR THE CONTINUOUS MANUFACTURING OF SILICONE RUBBER COMPOSITION

For which the following is a specification:

The present invention is a method for continuously manufacturing a silicone rubber base composition suitable for rolling. This invention is also silicone rubber base composition that results from this method.

BACKGROUND OF THE INVENTION

In mixing silicone rubber compositions, it is common practice in the art to first form a silicone rubber base composition consisting of polydiorganosiloxane gum and inorganic filler as main components. If necessary, various additives are also mixed into the base composition. This base composition can then formed into a silicone rubber molded product by mixing it with an organic peroxide or polyorganohydrogensiloxane and a platinum catalyst, and then heating the mixture.

Typically in the art, the silicone rubber base composition has been produced by mixing the starting material components in a double arm kneader-mixer, an internal mixer, or other batch-type mixer. However, mixers of the these types have low capacity and are unsuitable for mass production or continuous processing. It has been proposed, as described in Japanese Patent Application Laid Open No. 2-102007, first to turn a polydiorganosiloxanegum, an inorganic filler, and auxiliary agents into a powder, and then to continuously mix the components by passing them through a rotating dual-screw unidirectional rotary kneader-extruder. In particular, Japanese Patent Application Laid Open No. 6-313046 describes a process in which a polydiorganosiloxane gum, an inorganic filler, and auxiliary agents are continuously mixed in a dual-screw unidirectional rotary kneader-extruder and then their mixture is again mixed under heating conditions in a counter-rotating dual-screw extruder.

The continuous manufacturing processes of the above references require the use of a dual-screw kneader-extruder with a large length to diameter ratio. Furthermore, inorganic filler materials suitable for the process are limited to the use of such substances as fumed silica, sedimentary silica, or a similar reinforcing silica which does not create problems for the process. The use of an inorganic filler which has higher hardness or grain size, such as a diatomaceous earth powder or a quartz powder, lead to abrasive wear on the surfaces of the screws and cylinders of aforementioned dual-screw mixer-extruders. This results not only in the blackening of the silicone rubber composition during mixing, but also gradually in the decrease of the effect of kneading. Furthermore, in order to decrease a temporal creep hardening of the silicone rubber composition, the conventional process requires that the material inside the dual-screw mixer-extruder be subjected to heat treatment, and this, in turn, leads to an increase in energy consumption.

The present invention provides continuous manufacturing of a silicone rubber base composition by a method which does not require the use of a dual-screw mixer-extruder with a large length to diameter ratio, allows the use of such inorganic fillers as diatomaceous earth power, quartz or a similar large-grain and hard powder without abrasive wear of the screws and cylinders, does not cause blackening of the mixed silicone rubber composition, and does not cause production problems even when filmed silica, sedimentary silica, or a similar reinforcing silican are used in large quantities. Furthermore, the invention provides continuous manufacturing of a mass-like silicon rubber base composition with a process which does not require heat treatment of the material inside the kneader-extruder.

Figure 1:
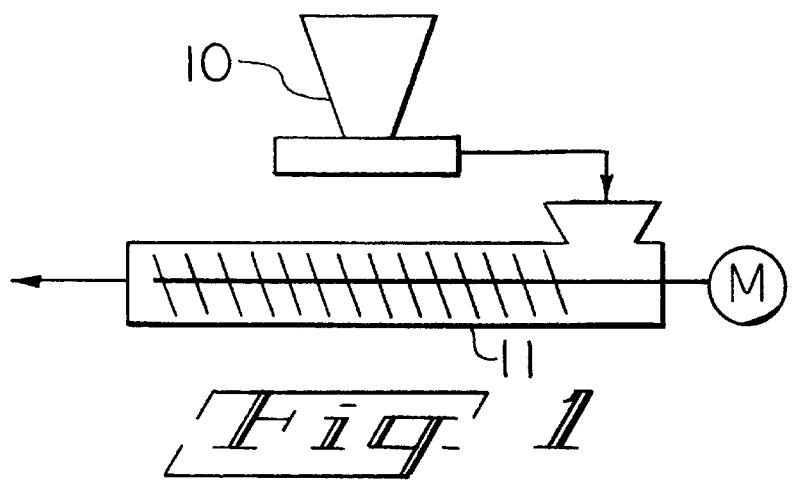
FIG. 1 is a sectional view of a metering feeder and multiple-stage sliding shear-type single-screw extruder 11 used in accordance with the present invention.

Reference Numerals Used in the Specification and Drawings

1 Extruding screw
2 Cylinder
3 Disk
3a Facing surface of disk
4 Circular projection
4a Facing surface of circular projection
5 Starting material feeding opening
6 Unloading opening
7 Helical blade of extruding screw 1
8 Filter
9 Outlet nozzle
10 Metering feeder
11 Multiple-stage sliding shear-type single-screw extruder
31 Recession on facing surfaces 3a
32 Projections on facing surfaces 3a
41 Recesses on facing surfaces 4a
42 Projections on facing surfaces 4a
M Motor

DETAILED DESCRIPTION OF THE INVENTION

The present invention is a method for manufacturing a silicone rubber base composition in a mass-like form, comprising: (A) forming a freely-flowable powdered silicone rubber composition comprising (a) a cross-linkable polydiorganosiloxane with a viscosity of at least $1 \times 10^5$ mPa.s at 25° C. and (b) an inorganic filler, and (B) continuously kneading and massing the powdered silicone rubber in a multiple-stage shear type single-screw extruder.

The multiple-stage shear type single-screw extruder consists of a cylinder with a starting-material feed opening at one end and an unloading opening at the other end and an extruding screw inserted into said cylinder. The extruding screw has a plurality of disks attached to the screw in a position perpendicular to the screw. A plurality of circular projections extend from the inner periphery of the cylinder and are arranged in the axial direction of the screw. The disks are rotationally installed between ie circular projections. Facing surfaces of the disks and the circular projections have radially-extending projections and recesses.

The cross-linkable polydiorganosiloxane which is component (a) suitable for the purposes of the present invention is a conventional linear polydiorganosiloxane which contains in one molecule two or more than two low-alkenyl groups, for example vinyl groups. Since the powdered silicone rubber composition cannot be easily obtained-when the viscosity is low, it is recommended that the viscosity at 25° C. be greater than 1×10$^5$ mPa.s and preferably within a range of 1×10$^6$ mPa.s to 1×10$^8$ mPa.s. Polydiorganosiloxane of this type is known and commercially produced. A typical example of the polydiorganosiloxane is a linear polymer represented by the following general formula: R$^1$(R$_2$SiO)$_n$SiR$_2$R$^1$, where R is a non-substituted or substituted monovalent hydrocarbon group which contains 0 to 0.1% of vinyl groups, R$^1$ is a non-substituted or substituted monovalenthydrocarbon group or a hydroxyl group, and n is between 1,000 and 10,000. In this formula R may be an alkyl group represented by a methyl group, an aryl group represented by a phenyl group, an alkenyl group represented by a vinyl group, and a substituted alkyl group represented by a 3,3,3-trifluoropropyl group. Examples of R$^1$ area methyl group, a vinyl group, a phenyl group, and a hydroxyl group. In the molecule, the alkenyl group may exist only at both terminals, in a side chain, or at both terminals and in the side chain at the same time. Component (a) may also be of a linear-chain type with some branches.

The inorganic filler which is component 5 of the present invention may be any filler suitable for use in combination with a silicone rubber compositions. Such an inorganic filler may be represented by a formed silica or dry-process silica, wet-process silica or sedimentary silica, or a similar reinforcing silica having a specific surface area greater than 50 m$^2$/g, are in forcing silica the surface of which has been subjected to hydrophobic treatment with an organic silicon compound (e.g., dimethyldichlorosilane, trimethylchlorosilane, hexamethyldisilazane), a diatomaceous earth powder, quartz powder, powdered aluminum hydroxide, powdered aluminum oxide, powdered magnesium oxide, powdered calcium carbonate, or a similar extending type filler. The filler of each type can be used individually or in combination of two or more than two. There are no special limitations with regard to the quantity of component (b) used in the process, provided this quantity is sufficient to turn component (a) into a mass-like form. However, the best results are obtained when component (b) is used in an amount of 5 to 200 parts by weight, preferably 10 to 150 parts by weight against 100 parts by weight of component (a).

Component (b) is added to component (a), and, if component (a) is an untamed reinforcing silica, in order to improve its degree of dispersion during kneading, to reduce creep hardening and to adjust plasticity after kneading, the mixture may be combined with an optional plasticizer (c), such as dimethyldimethoxysilane, trimethylhydroxysilane, diphenylsilanediol, and dimethylpolysiloxane of low degree of polyinenzation with a terminal silanol. It is recommended that component (c) be used in an amount of 0.5 to 40 parts by weight against 100 part by weight of reinforcing silica. If necessary, the silicone rubber can be combined with other conventional additives such as silicone-resin type reinforcing agents, heat-resistant agents, combustion-retarding agents, adhesion-imparting agents, dyes, agents improving processing by rolling, mold-release agents.

In the method of the present invention, a freely flowable powdered silicone rubber composition is prepared first. Components (a) and (b), and optional component(c), are loaded into a rotary mixer of the type which has mixing blades which rotate with a high speed, such as a Henschel mixer. Then the mixture is turned into a powder by shearing while being heated to a temperature of 100 to 200° C.

The prepared freely-flowable powdered silicone rubber compositions loaded via a metering feeder 10 into a multiple-stage sliding shear-type single-screw extruder 1 shown in FIG. 1, and the compositions then kneaded for massing.

Figure 2:
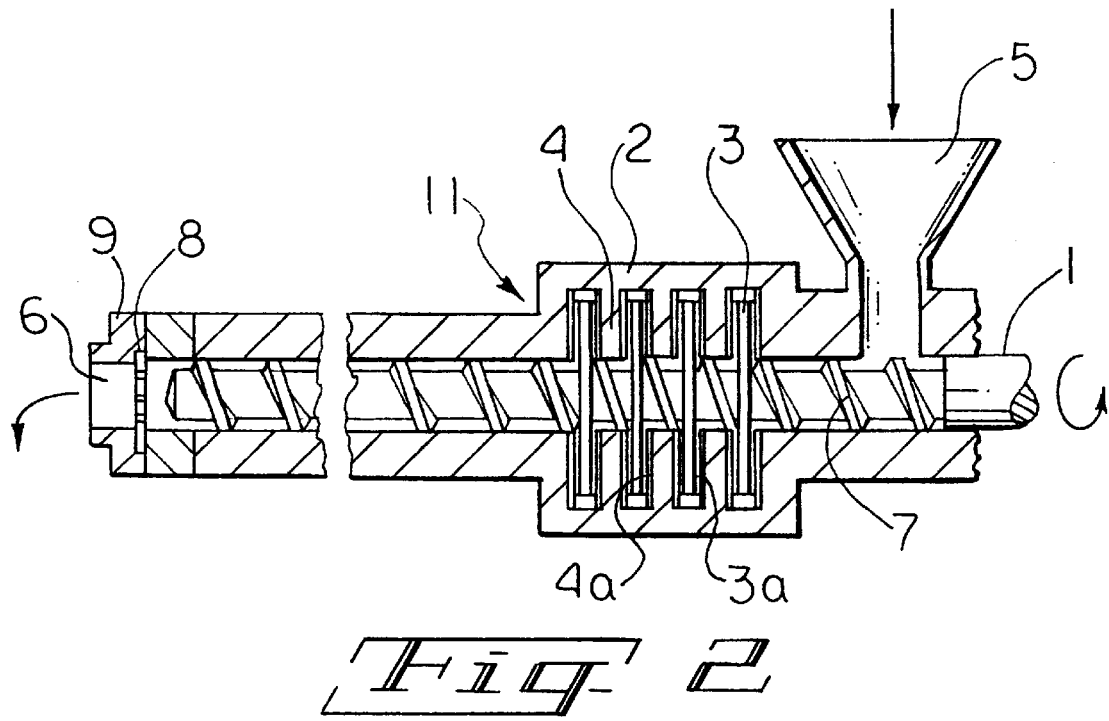
FIG. 2 is a sectional view of multiple-stage sliding shear-type single-screw extruder 11 used in accordance with one practical example of the present invention.

As shown in FIG. 2, multiple-stage sliding shear-type single-screw extruder 11 consists of a cylinder 2 with a starting-material feed opening 5 at one end and an unloading opening 6 at the other end and an extruding screw 1 inserted into aforementioned cylinder 2. Extruding screw 1 is connected to a motor, desiated in the drawing as M. Extruding screw 1 has a plurality of disks 3 attached to it in positions perpendicular to the screw. A plurality of circular projections 4 extend from the inner periphery of cylinder 2. These projections are arranged in the axial direction of screw 1. Disks 3 are rotatably installed between circular projections 4. Facing surfaces 3a of disks 3 and facing surfaces 4a of circular projections 4 have radially-extending recesses and projections 31, 32 and 41, 42, respectively.

Facing surfaces 3a of disks 3 and facing surfaces 4a of circular projections 4 are not in contact with each other. Similarly, the outer peripheral surfaces of disks and inner peripheral surfaces of cylinder 2 do not have physical contact. The inner peripheral surfaces of circular projections 4 and the outer peripheral surface of extruding screw 1 also do not have contact. Thus, the mixture passes through the gaps between aforementioned parts.

Extruding screw 1 has a helical blade 7 attached to its outer surface. When the screw rotates, helical blade 7 conveys the powdered silicone rubber composition, which is supplied via a material-feeding opening 5, in the axial direction of the screw along the space between disks 3 and circular projections 4.

Figure 3:
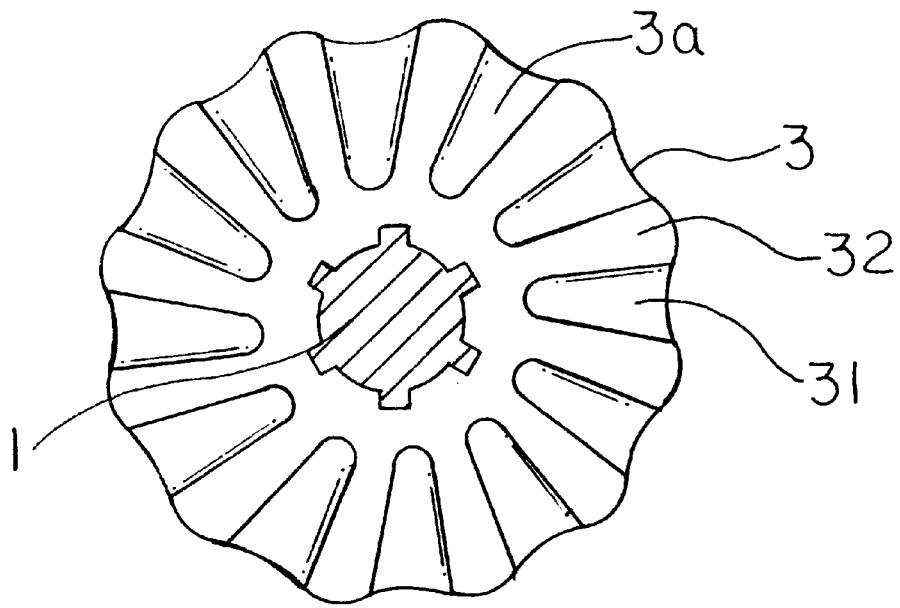
FIG. 3 is face view of disk 3 which is fixed to extruding screw 1 of multiple-stage sliding shear-type single-screw extruder 11.
Figure 4:
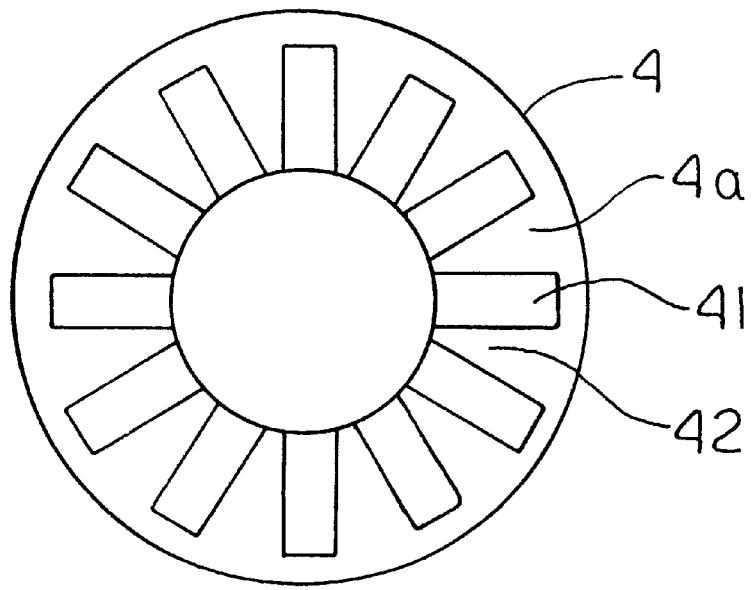
FIG. 4 is a face view of circular projection 4 extending from the inner peripheral surface of cylinder 2 in multiple-stage sliding shear-type single-screw extruder 11.

Radially-extending recesses 31 and projections 32 on surfaces 3a of disks 3, shown in FIG. 3, and radially extending recesses 41, and projections 42 on facing and facing surface 4a of circular projections 4, shown in FIG. 4, impart to the powdered silicone rubber material shearing force. As the freely flowable powdered silicone rubber composition passes sequentially between disks 3 and circular projections, it experiences the effect of repeating shearing actions, whereby his material is converted into a mass-like form. The resulting uniformly mixed silicone rubber composition is passed via a filter 8, through outlet nozzle 9, and is unloaded through unloading opening 6. It is recommended that the gap between disks 3 and circular projections 4 be within the range of 0.3 to 3 mm.

Multiple-stage sliding shear-type single-screwdriver 11, shown in FIG. 2, has four disks 3 and three circular projections 4. If necessary, however, the number of disks and projections can vary from 2 to 10. Furthermore, metering feeder 10 continuously supplies dosed quantities of the powdered silicone rubber composition to the multiple-stage sliding shear-type single-screw extruder. However, feeders of other type which are similar in function can be employed for this purpose.

EXAMPLES

In these examples, the quantities are indicated in parts by weight, and viscosities are indicated at 25° C. Plasticity of the silicone rubber composition was measured according to JIS K6300. Suitability for rolling was measured by repeatedly passing the material between two rollers. Physical properties of a silicone rubber sheet were measured in compliance with the requirements of JIS K6301.

Suitability for rolling under industrial conditions was evaluated as follows: the silicone rubber composition dose not pass the test if after passing between calendar rolls the material does not wind onto the roll and falls down; the results are positive if after passing between calendar rolls the material is wound onto the roll and does not fall.

PRACTICAL EXAMPLE 1

A mixtue was prepared of the following components: 100 parts of a dimethylsiloxane-methylvinylsiloxanecopolymer gum (containing 0.2 mole % of methylvinylsiloxane units) with both molecular chain terminals blocked with trimethylsiloxy groups, the viscosity being 15×10$^6$ mPa.s; 50 parts of fumed silica having a specific surface area of 200 m$^2$/g; 90 parts of powdered diatomaceous earth with a 5 μm average grain diameter; and 12 parts of polydimethylsiloxane of 50 mPa.s viscosity with silanol groups on both molecular terminals. The mixture was loaded into a Henschel mixer, heated to 150° C., and was mixed for 10 min with 1,000 rpm speed of the rotating blade. As a result, a freely-flowable powdered silicone rubber composition was obtained.

This powdered silicone rubber composition was loaded into a metering feeder 10 shown in FIG. 1, from where the material was supplied with a rate of 20 kg/hr into starting material loading opening 5 of the multiple-stage sliding shear-type single-screw extruder 11. A distance between the starting-material feeding opening and the unloading opening of multiple-stage sliding shear-type single-screw extruder 11 was equal to 1,500 mm. Extruding screw 1 had a diameter of 65 mm. The screw rotated with a speed of 50 rpm. A feed screw (not shown in the drawings) parallel to extruding screw 1 was installed directly beneath starting-material feeding opening 5. Disks 3 and circular projections 4 both had a diameter of 140 mm. A gap between disks 3 and the inner projections 4 was equal to 0.5 mm. The gaps between extruding screw 1 and inner surface of cylinder 2, between disks 3 and inner surface of cylinder 2, and between inner projections 4 and extruding screw 1 were all equal to 1.0 mm. The surfaces of the extruder which are to be in contact with the silicone rubber material were made of a wear-resistant steel. The powdered silicone rubber composition was kneaded in the aforementioned extruder and was unloaded through unloading opening 6 of the extruder as a uniform silicone rubber base composition. The color of the obtained silicone rubber composition was observed, its plasticity was measured, and its suitability for treatment with calendar rollers was tested. The results are shown in Table 1. One hundred (100) parts of the silicone rubber composition were combined with 0.5 parts of 2,5-dimethyl-2,5-di(t-butylperoxy)hexane. The mixture was uniformly mixed between two rolls, and, as a result, a hardener-containing silicone rubber composition was prepared. This silicone rubber composition was formed into a 2 mm-thick silicone-rubber sheet by pressure molding for 10 min. at a temperature of 170° C. Physical properties of the aforementioned sheet were measured. The results of measurement are shown in Table 1.

COMPARATIVE EXAMPLE 1

A silicone rubber base composition was prepared by using the same components as in Practical Example 1. However, instead of first molding a freely-flowable silicone powdered rubber composition, the ingredients were loaded directly into starting-material feeding opening 5 of multiple-stage shear-type single-screw extruder 11. The components were then treated under the same conditions as the powdered silicone rubber composition in Practical Example 1. The color of the obtained silicone-rubber composition was observed, its plasticity was measured, and its suitability for treatment with calendar rollers was tested The results are shown in Table 1. The obtained silicone rubber composition was formed into a sheet and cured under the same conditions as in Practical Example 1, and the physical properties of the sheet were measured. The results are shown in Table 1.

COMPARATIVE EXAMPLE 2

A silicone rubber base composition was prepared from the same powdered silicone rubber composition as in Practical Example 1. However, instead of the multiple-stage sliding shear-type single-screw extruder of Practical Example 1, the powdered silicone rubber composition was loaded into a feeding opening of a dual-screw kneader-extruder having two screws rotating in the same direction. The extruder had 50 mm screw diameters, an length to diameter (L/D) ratio equal to 40, a 0.25 mm gap between the extruding screws and the inner surface of the cylinder. The extending screws rotated with a speed of 300 rpm. The surfaces which are to be in contact with the silicone rubber composition were made of a wear-resistant steel. The material was continuously fed with a rate of 20 kg/h. The color of the obtained silicone-rubber composition was observed, its plasticity was measured, and its suitability for treatment with calendar rollers was tested. The results are shown in Table 1. The obtained silicone rubber composition was formed into a sheet and cured under the same conditions as in Practical Example 1, and the physical properties of the sheet were measured. The results are shown in Table 1.

TABLE 1

|  | Practical Example | Comparative Example 1 | Comparative Example 2 |
|---|---|---|---|
| Appearance (color) | White | White | Black-Ash |
| Suitability for Rolling | Suitable | Unsuitable | Unsuitable |
| Plasticity |  |  |  |
| Directly after preparation (mm × 100) | 330 | 370 | 360 |
| After month retaining (mm × 100) | 450 | 600 | 580 |
| Hardness | 73 | 78 | 71 |
| Tensile strength (kgf/cm$^2$) | 83 | 60 | 7 |
| Relative elongation (%) | 400 | 280 | 380 |
| Tearing strength (kgf/cm) | 13 | 7 | 10 |

PRACTICAL EXAMPLE 2

A silicone rubber base composition was prepared by the same manner as in Practical Example 1, with the exception that instead of 50 g of fumed silica, with a 200 m$^2$/g specific surface area and 90 parts of diatomaceous earth powder with a 5 μm average grain size, the composition contained 70 parts of fumed silica with a 200 m$^2$/g specific surface area and 25 parts of polydimethyl siloxane having silanol on both terminals. After conditions were the same as in Practical Example 1. The obtained silicone rubber base composition was of a semi-transparent, milky color. It had good suitability for rolling under industrial conditions.

COMPARATIVE EXAMPLE 3

A silicone rubber base composition was prepared from the same powdered silicone rubber composition as in Practical Example 2. The powdered silicone rubber was then kneaded in a dual-screw kneader-extruder having two screws rotating in the same direction, as in Comparative Example 2. The obtained silicone rubber composition was of a semitransparent white-ash color.

We claim:

1. A method for manufacturing of a silicone rubber base composition in a mass form, comprising:
   (A) preparing a freely flowable powdered silicone rubber composition comprising
      (a) a cross-linkable polydiorganosiloxane with a viscosity of at least $1 \times 10^5$ mPa.s at 25° C. and
      (b) an inorganic filler, and
   (B) continuously kneading and massing the powdered silicone rubber composition in a multiple-stage sliding shear single screw extruder.

2. The method of claim 1, wherein said freely-flowable powdered silicone rubber composition is produced by mechanically shearing at a high speed the cross-linkable polydiorganosiloxane and the inorganic filler.

3. The method of claim 1, wherein the cross-linkable polydiorganosiloxane is a polydiorganosiloxane which contains vinyl groups.

4. The method of claim 1, wherein the inorganic filler is selected from the group consisting of reinforcing silica filler and a reinforcing silica filler combined with a diatomaceous earth powder.

5. The method of claim 4 wherein the freely flowable powdered silicone rubber composition further comprises (c) 0.5 to 40 parts by weight of a plasticizer for each 100 parts by weight of reinforcing silica.

6. The method of claim 5 wherein the plasticizer is selected from the group consisting of dimethyldimethoxysilane, trimethylhydroxysilane, diphenysilanediol, and silanol-terminated polydimethylsiloxane.

7. The method of claim 2, wherein said high-speed mechanical shearing is carried out at a temperature of 100 to 200° C.

8. The method of claim 1 wherein said multiple-stage sliding shear single-screw extruder comprises:
   a cylinder with a starting-material feeding opening at one end and an unloading opening at the other end;
   an extruding screw inserted into said cylinder, said extruding screw having a plurality of disks attached to said screw in a position perpendicular to said screw; and
   a plurality of circular projections extending from the inner periphery of said cylinder and being arranged in the axial direction of said screw, said disks being rotatably installed between said circular projections, facing surfaces of said disks and said circular projections having radially-extending projections and recesses.

* * * * *